United States Patent
Matsuoka

(10) Patent No.: US 6,318,915 B1
(45) Date of Patent: *Nov. 20, 2001

(54) IMAGE FORMING APPARATUS AND SYSTEM, INFORMATION PROCESSING APPARATUS, AND THEIR CONTROL METHOD

(75) Inventor: Yasushi Matsuoka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,033

(22) Filed: Apr. 14, 1999

(30) Foreign Application Priority Data

Apr. 17, 1998 (JP) .................................... 10-108048
Apr. 12, 1999 (JP) .................................... 11-103837

(51) Int. Cl.$^7$ .............................. B41J 21/16; B41J 19/00
(52) U.S. Cl. ........................................... 400/279; 400/283
(58) Field of Search .................................. 400/279, 283, 400/61, 70, 76

(56) References Cited

U.S. PATENT DOCUMENTS

| 4,723,129 | 2/1988 | Endo et al. . | |
|---|---|---|---|
| 4,740,796 | 4/1988 | Endo et al. . | |
| 5,129,048 | 7/1992 | Ng | 395/110 |
| 5,316,396 | * 5/1994 | Fukaya | 400/76 |
| 5,818,009 | 10/1998 | Nakagawa | 395/105 |
| 5,819,009 | 10/1998 | Nakagawa | 395/105 |
| 5,951,174 | * 9/1999 | Handa | 400/120.01 |

FOREIGN PATENT DOCUMENTS

| 0802503 | 10/1997 | (EP) | G06K/15/00 |
|---|---|---|---|
| 62-23678 | * 1/1987 | (JP) . | |
| 64-78070 | * 3/1989 | (JP) . | |
| 8-164600 | * 6/1996 | (JP) . | |

* cited by examiner

Primary Examiner—John S. Hilten
Assistant Examiner—Charles H. Nolan, Jr.
(74) Attorney, Agent, or Firm—Fitzpatrick, Cella, Harper & Scinto

(57) ABSTRACT

A printer having a plurality of recording heads each capable of recording with a recording width is connected to a host apparatus. The host apparatus develops an image to generate recording data corresponding to the plurality of recording heads and transmits the recording data to the printer. During the development of the image, the host computer obtains leftmost and rightmost end values for the recording data and transmits them to the printer. The printer determines a scan range of the plurality of recording heads based on the leftmost and rightmost end values, and performs printing the transmitted recording data.

19 Claims, 12 Drawing Sheets

IMAGE FORMING APPARATUS AND SYSTEM, INFORMATION PROCESSING APPARATUS, AND THEIR CONTROL METHOD

BACKGROUND OF THE INVENTION

The present invention relates to an image forming apparatus for printing an image by scanning a print head in the main scanning direction, an information processing apparatus which is connected to the image forming apparatus to provide print information, an image forming system, and its control method.

Conventionally, a printer which forms an image by repeating a print scan of a print head in the main scanning direction, and feeding of a print medium in the sub-scanning direction is known. In printers of this type, those which limit the scan width and those which do not limit it upon print scan of the print head are known. When the scan width is not limited upon print scan, the print head is scanned from one end to the other of the uppermost line of a print sheet in the main scanning direction to print data. Then, the sheet is fed in the sub-scanning direction, and the same process is done for the next line. This process repeats itself until the head reaches the lowermost line of the print sheet, thus printing an image on the entire medium. On the other hand, when the scan width of the print head in the main scanning direction is limited, data is checked in the printer, and the scan width is determined on the basis of the print position to be actually printed in the main scanning direction.

However, in the prior art, when the scan width of the print head in the main scanning direction is not limited, the head must also scan a non-print range, resulting in a wasteful print process time.

On the other hand, when the scan width in the main scanning direction is limited, since data is checked in the printer and the scan width in the main scanning direction is determined on the basis of the data position to be actually printed in the main scanning direction, checking data in the printer requires a long time, and the print time cannot be shortened as expected.

Especially, when the print width in the sub-scanning direction per print scan is increased using a plurality of print heads, a longer check time is required for determining the print scan width.

SUMMARY OF THE INVENTION

The present invention has been made in consideration of the above-mentioned problems, and has as its object to efficiently control the print scan range of a print head in the main scanning direction so as to shorten the print time.

It is another object of the present invention to detect the scan range of a print head by a host apparatus that provides print data to a printer, and inform the printer of the detected range so as to achieve high-speed printing as a whole system.

It is still another object of the present invention to inform the printer of the scan range using a value used for controlling a printer engine, so as to further reduce the load on the printer.

In order to achieve the above objects, according to one aspect of the present invention, there is provided an information processing apparatus connected to a printer which has a plurality of recording heads each capable of recording with a recording width, and performs printing by scanning the plurality of recording heads in a main scanning direction, comprising generation means for generating print data to be provided to the printer, acquisition means for acquiring range information indicating a print range in the main scanning direction, corresponding to each of the plurality of recording heads on the basis of the print data, informing means for informing the printer of the range information acquired by the acquisition means, and transmission means for transmitting the print data to the printer.

According to another aspect of the present invention, there is provided an information processing apparatus connected to a printer which has a plurality of recording heads each capable of recording with a recording width, and performs printing by scanning the plurality of print heads in a main scanning direction, comprising generation means for generating print data to be provided to the printer, acquisition means for acquiring rightmost and leftmost end print positions in units of a recording width on the basis of the print data, informing means for informing the printer of the rightmost and leftmost end print positions acquired by the acquisition means, and transmission means for transmitting the print data to the printer.

In order to achieve the above objects, according to still another aspect of the present invention, there is provided an image forming apparatus comprising the following arrangement. That is, there is provided an image forming apparatus which has a plurality of recording heads each capable of recording with a recording width, and performs printing by scanning the plurality of recording heads in a main scanning direction, comprising reception means for receiving range information indicating a print region of print data from an external apparatus together with the print data corresponding to the plurality of recording heads, holding means for holding the range information received by the reception means in correspondence with an area to be recorded by one scanning operation of the plurality of recording heads, determination means for determining rightmost and leftmost end print positions in the main scanning direction for the print data based on the range information held in the holding means, and image forming means for printing an image by scanning the plurality of recording heads in the main scanning direction within a range defined by the rightmost and leftmost end print positions determined by the determination means.

In order to achieve the above objects, according to still another aspect of the present invention, there is provided an image forming system comprising the following arrangement. That is, there is provided an image forming system which comprises a printer which has a plurality of recording heads each capable of recording with a recording width, and performs a printing by scanning the plurality of recording heads in a main scanning direction, and a host apparatus for transmitting print data to the printer, comprising generation means for generating print data to be provided to the printer, acquisition means for acquiring rightmost and leftmost end print positions in units of recording heads on the basis of the print data corresponding to the plurality of recording heads, determination means for determining a scan range of the plurality of recording heads on the basis of the rightmost and leftmost end print positions acquired by the acquisition means, and image forming means for forming an image on the basis of the print data by moving the plurality of recording heads within the scan range determined by the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

Preferred embodiments of the present invention will now be described in detail in accordance with the accompanying drawings.

First Embodiment

Figure 1:
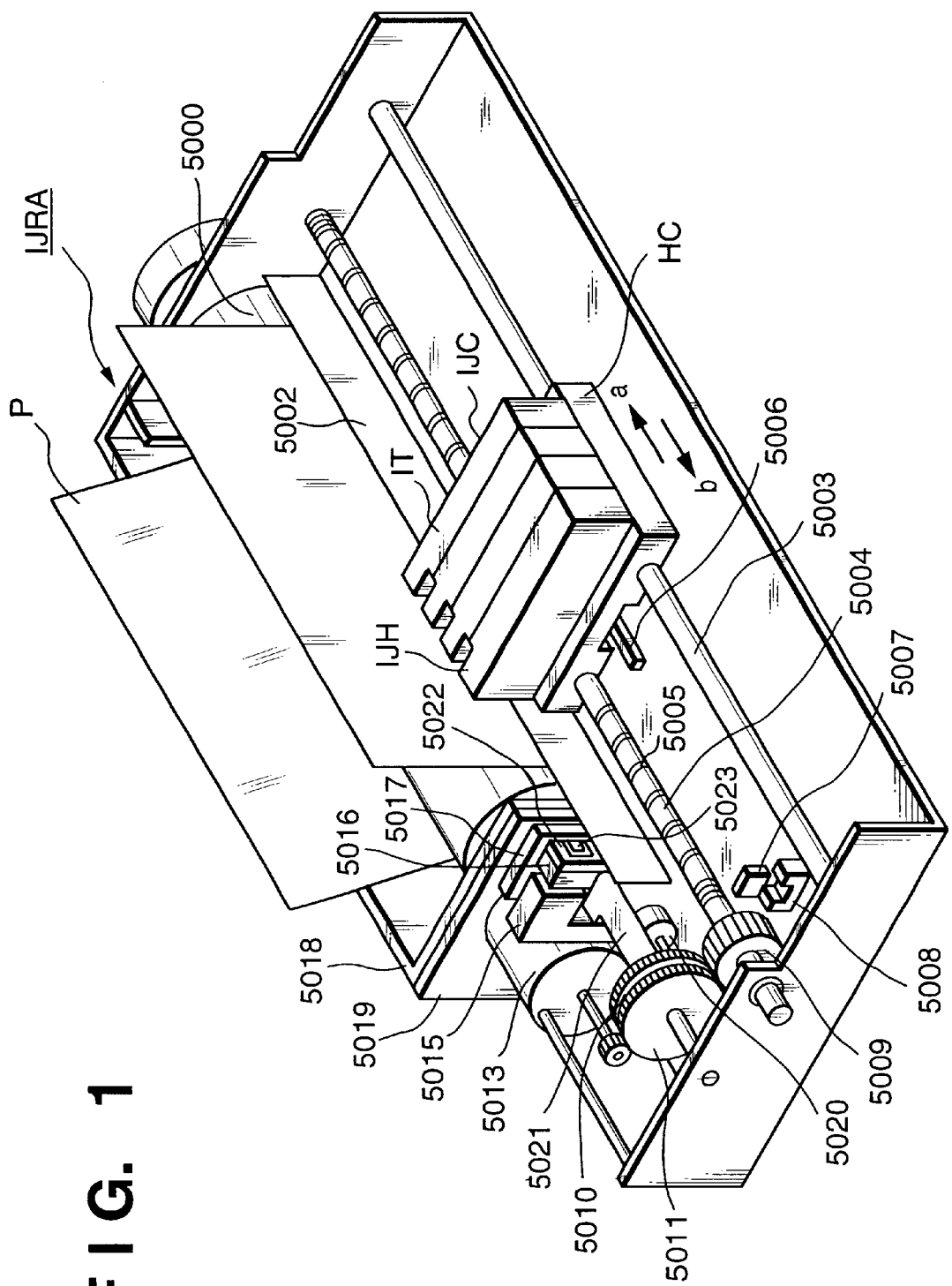
FIG. 1 is a schematic perspective view of an ink-jet printing apparatus to which the present invention can be applied.

FIG. 1 is a schematic view of an ink-jet printing apparatus to which the present invention can be applied. Referring to FIG. 1, a lead screw 5004 rotates via driving force transmission gears 5011 and 5009 upon forward/reverse rotation of a driving motor 5013. A carriage HC has a pin (not shown), which engages with a spiral groove 5005 of the lead screw 5004, and reciprocally moves in the directions of arrows a and b upon rotation of the lead screw 5004. An ink-jet cartridge IJC is mounted on this carriage HC. Also, four ink-jet heads IJH are mounted on the ink-jet cartridge. In this embodiment, each of the four ink-jet heads has a nozzle line corresponding to an identical recording width.

Reference numeral 5002 denotes a paper pressing plate which presses a paper sheet against a platen 5000 along the moving direction of the carriage HC. Reference numerals 5007 and 5008 denote photocouplers which serve as home position detection means for confirming the presence of a lever 5006 of the carriage in the corresponding region, and switching, e.g., the rotation direction of the motor 5013. Reference numeral 5016 denotes a member for supporting a cap member 5022 that caps the front surface of each print head. Reference numeral 5017 denotes a cleaning blade; and 5019, a member which holds the blade 5017 to be movable in the back-and-forth direction. These members are supported by a main body support plate 5018. The blade 5017 is not limited to such specific one, but a known cleaning blade can be applied to this embodiment. Reference numeral 5012 denotes a lever for initiating suction. The lever 5012 moves upon movement of a cam 5020 which engages with the carriage, and its movement is controlled by a known transmission mechanism such as clutch switching by the driving force from a driving motor.

These capping, cleaning, and suction recovery are performed at their corresponding positions upon operation of the lead screw 5005 when the carriage arrives the region on the home position side. However, the present invention is not limited to a specific arrangement, as long as desired operations are performed at known timings.

Figure 2:
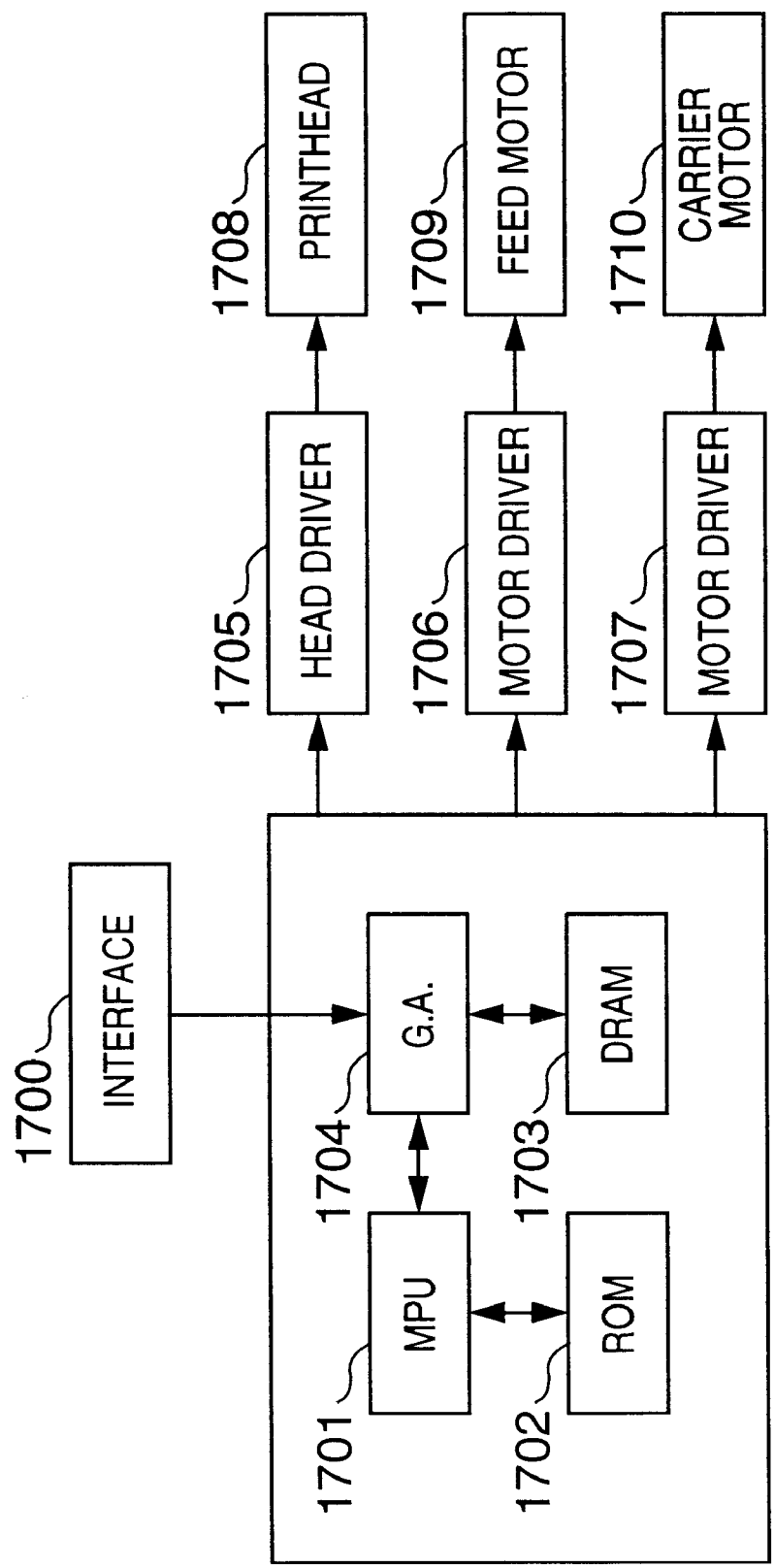
FIG. 2 is a block diagram showing the arrangement of the ink-jet printing apparatus.

The control arrangement for implementing printing control of the aforementioned apparatus will be explained below with reference to the block diagram shown in FIG. 2. Referring to FIG. 2 that shows a control circuit, reference numeral 1700 denotes an interface for inputting a print signal; 1701, an MPU; 1702, a program ROM for storing a control program executed by the MPU 1701; and 1703, a dynamic RAM (to be referred to as a DRAM hereinafter) for saving various data (the print signal, print data supplied to the heads, and the like). Reference numeral 1704 denotes a gate array for controlling supply of print data to print heads 1708, and also controlling data transfer among the interface 1700, MPU 1701, and RAM 1703. Reference numeral 1710 denotes a carrier motor for conveying the print heads 1708; and 1709, a feed motor for feeding a print sheet. Reference numeral 1705 denotes a head driver for driving the heads; and 1706 and 1707, motor drivers for driving the feed motor 1709 and carrier motor 1710.

The operation of the control arrangement will be explained below. When a print signal is input to the interface 1700, the print signal is converted into print data for printing between the gate array 1704 and MPU 1701. Then, the motor drivers 1706 and 1707 are driven, and the print heads are driven in accordance with the print data supplied to the head driver 1705, thus printing the data.

In the first embodiment, a case will be exemplified wherein a host computer controls the print scan width. Note that in this embodiment the present invention is applied to the printer comprising the four print heads capable of recording in an identical recording width, as described above. In the following description, since the height of the nozzle array corresponds to recording width, the recording width of one print head will also be referred to as a column height.

Figure 3:
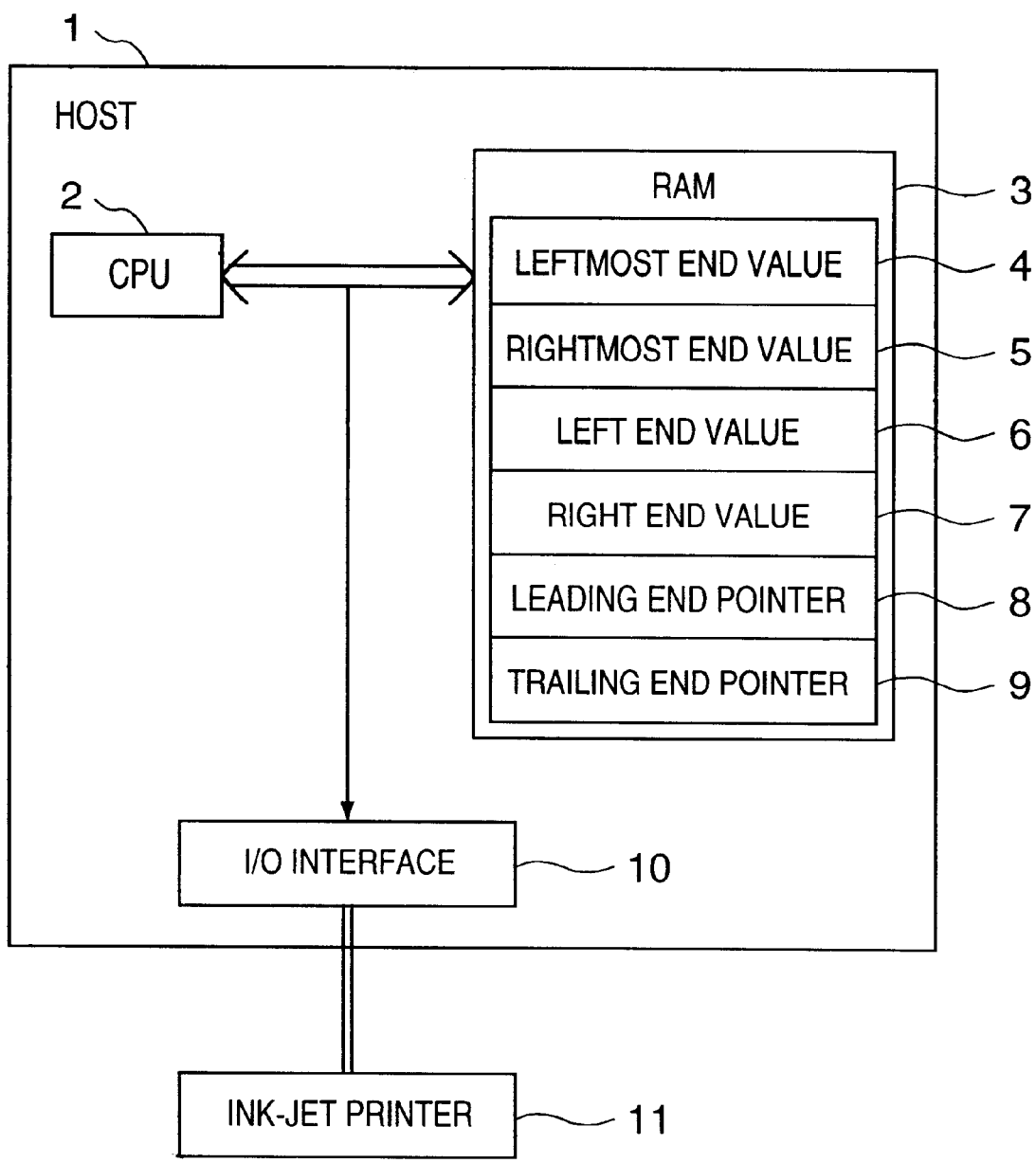
FIG. 3 is a diagram showing the arrangement of a printer system according to the first embodiment.

FIG. 3 shows the arrangement of a printer system according to the first embodiment. Reference numeral 1 denotes a host computer. In the host computer 1, reference numeral 2 denotes a CPU, which comprises a microprocessor, ROM, RAM, and the like (not shown), and implements various kinds of control. Reference numeral 3 denotes a RAM which stores various values required for the print scan width control of this embodiment. Reference numeral 10 denotes an I/O interface which communicates with a printer 11 via Centronics, RS232C, or the like.

On the RAM 3, areas that serve as registers 4 to 9 are assured. The leftmost end value register 4 stores the leftmost end value of the scan range in the main scanning direction corresponding to a space of print data for the total head height (for the four heads (four columns) in this embodiment) (to be described later with reference to FIG. 4). The rightmost end value register 5 stores the rightmost end value of the scan range in the main scanning direction corresponding to the space of print data for the total head height. The left end value register 6 stores left end values in units of columns corresponding to the space for the total head height. The right end value register 7 similarly stores the right end values in units of columns corresponding to the space for the total head height. The head leading end point register 8 stores a head leading end pointer, and the head trailing end pointer register 9 stores a head trailing end pointer. Note that the roles of the head leading and trailing end pointers will become apparent from the following description. Those registers will be simply referred to as the registers 4 to 9 hereinafter.

Figure 4:
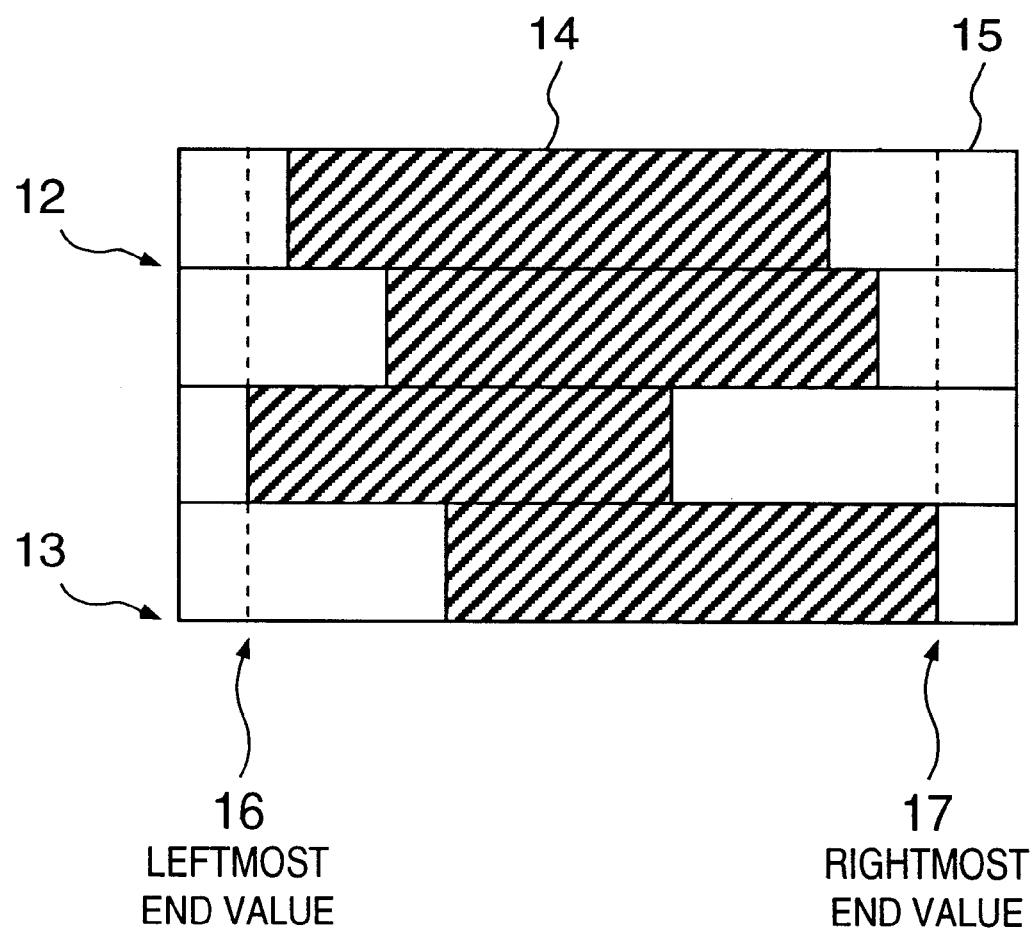
FIG. 4 shows different scan ranges of data in the main scanning direction, which correspond to four print heads.

FIG. 4 shows different scan ranges in the main scanning direction of data corresponding to the four print heads. Data corresponding to the scan ranges of the individual heads are stored in units of columns 15 each of which is equal to the recording width of one head. In this embodiment, the right and left ends are detected in units of head heights (column heights), and these values are stored in the registers 7 and 6. In this embodiment, since print scans are made using the four heads, a single scan in the main scanning direction corresponds to four columns, and four each right and left end values are respectively stored in the registers 7 and 6. Of the stored right and left end values, the value indicating the rightmost end, and that indicating the leftmost end are respectively stored in the registers 5 and 4 as the rightmost and leftmost end values. In the example shown in FIG. 4, a position 16 is stored in the register 4 as the leftmost end value, and a position 17 is stored in the register 5 as the rightmost end value.

More specifically, the rightmost and leftmost end values are held in the registers 5 and 4 by the following process. Referring to FIG. 4, right and left end values for the uppermost column are detected, and are stored in the registers 7 and 6. Only when the uppermost column is processed, those right and left end values are stored in the registers 5 and 4 as the rightmost and leftmost end values.

A head leading end pointer 12 is advanced by one to point to the second column (to point to the lowermost line of the second column in practice). The rightmost and leftmost end values stored in the registers 5 and 4 are respectively compared with right and left end values of the scan range in the main scanning direction in the next print space (a space for one column). As described above, since the head leading end pointer has already moved by one column, the right and left end values of the scan range pointed by the head leading end pointer 12 are respectively compared with the rightmost and leftmost end values stored in the registers 5 and 4. As a result of comparison, if the left end value indicates a position on the left side of the leftmost end value, it is determined that the leftmost end value has changed, and the register 4 is updated by that left end value. Likewise, if the right end value indicates a position on the right side of the rightmost end value, it is determined that the rightmost end value has changed, and the register 5 is updated by that right end value.

Upon completion of detection of the right and left end values for four columns, the rightmost and leftmost end values in that total head height space are stored in the registers 5 and 4. Hence, those values are supplied to the ink-jet printer 11 together with print data for that total head height space. The ink-jet printer 11 moves the print heads within the range defined by the received rightmost and leftmost end values to print data.

The aforementioned process will be described in more detail below with reference to the flow chart shown in FIG. 5.

In general, upon mapping print data to a print image on the host computer 1 side, it is done in units of bands (intra-band mapping). Note that each band is obtained by segmenting a page into a plurality of bands, and upon completion of a process for one band, the next band process is executed. Note that each band size varies depending on the memory size that the printer driver can use, and the like. In this embodiment, even when the band height in band mapping does not match the column height, the rightmost and leftmost end values can be accurately detected.

Figure 5:
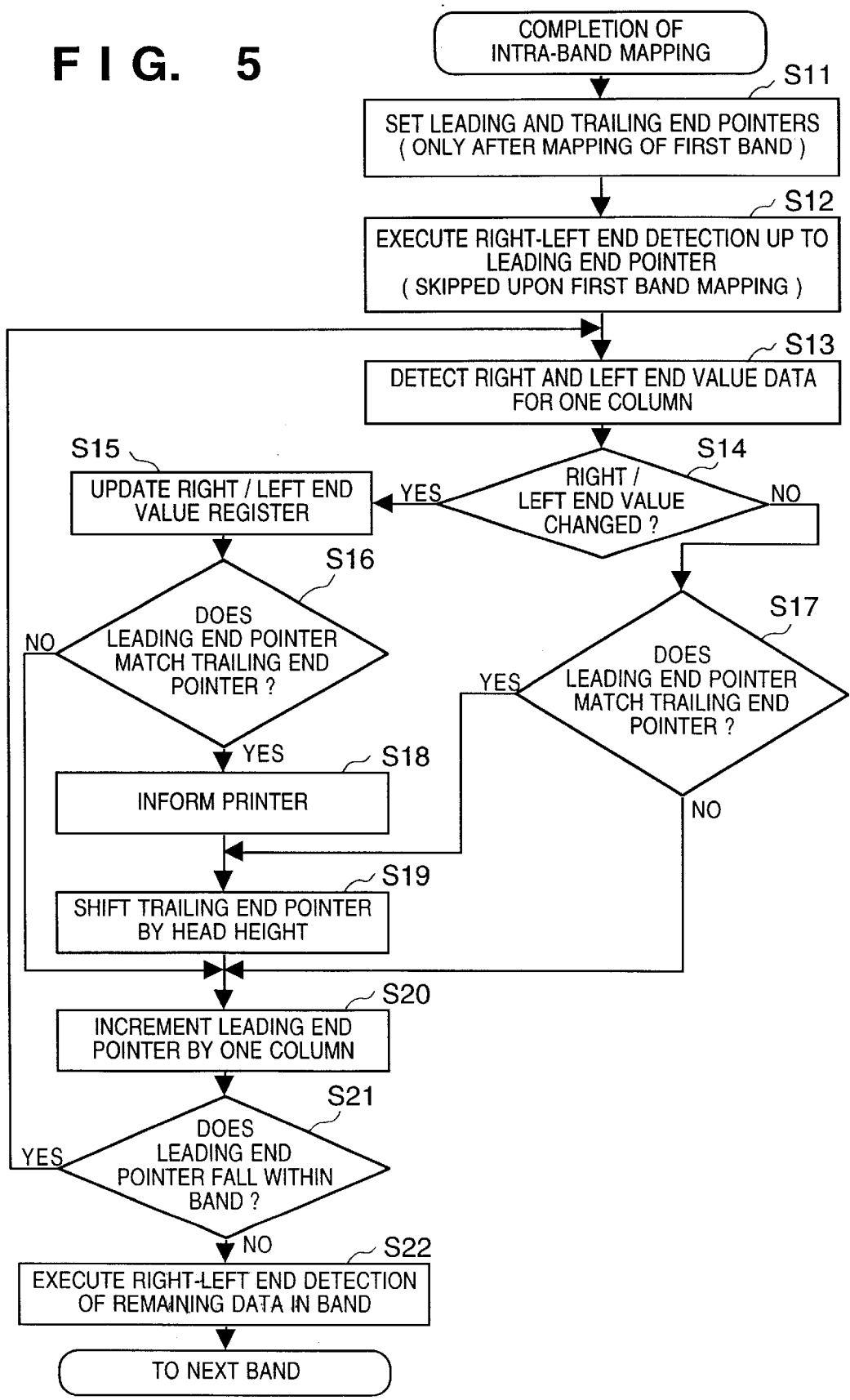
FIG. 5 is a flow chart showing the processing sequence of a host computer from when intra-band data is transferred to a printer upon completion of intra-band mapping, until the process for the next band starts.

FIG. 5 is a flow chart showing the processing sequence of a host computer after completion of intra-band mapping, until the process for the next band starts. Upon completion of intra-band mapping, the processing flow varies depending on the position of the head leading end pointer, as shown in FIG. 5. Note that the processing to be described below is executed by a control program such as a printer driver or the like.

Figure 10:
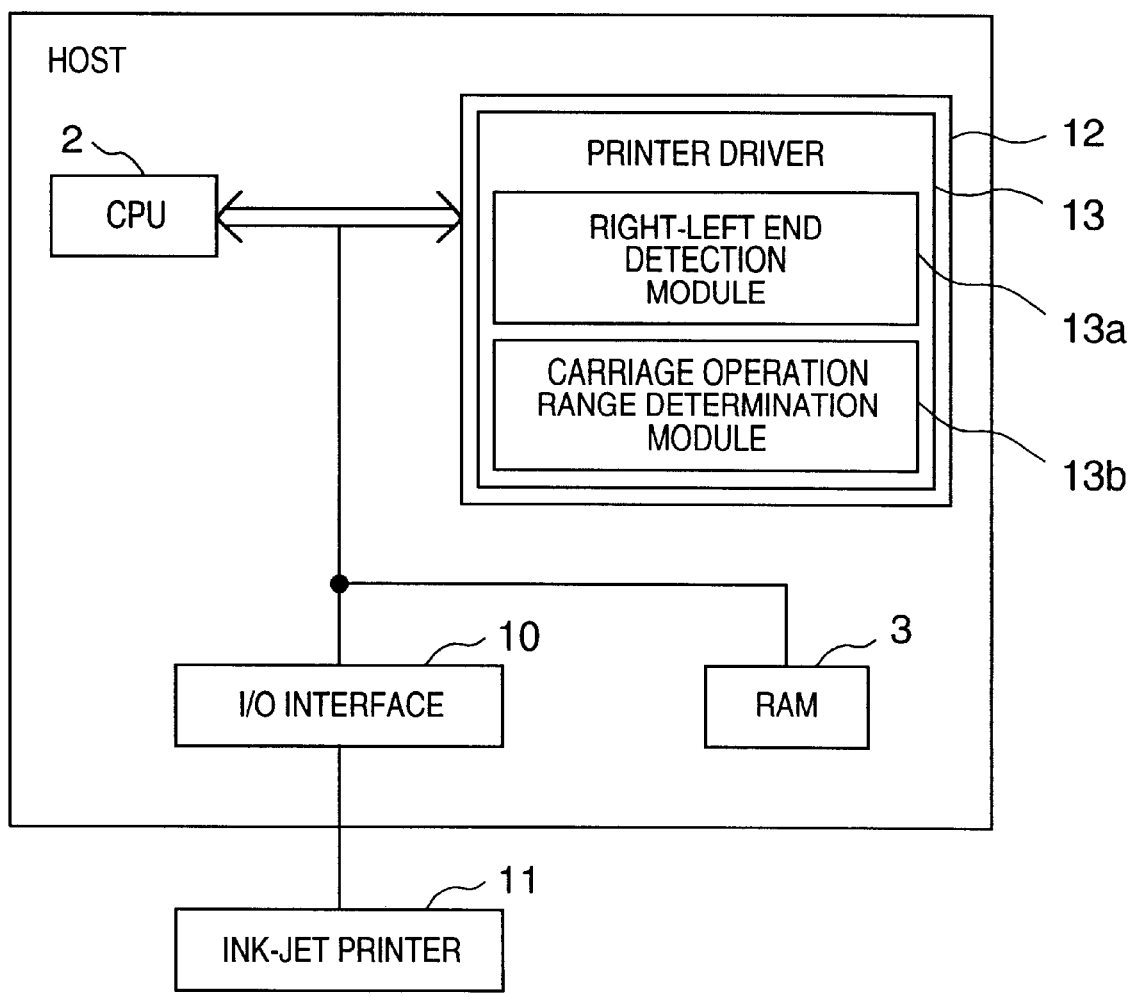
FIG. 10 is a schematic block diagram showing the arrangement of an image forming system according to the third embodiment.

More specifically, as shown in FIG. 10, the CPU 2 loads a printer driver 13 installed in an external storage device 12 onto a RAM (main memory; not shown), and executes it. In the first embodiment, a right-left end detection module 13$a$ is executed to implement the processing to be described below according to the flow chart shown in FIG. 5. A carriage operation range determination module 13$b$ is a program module used in the third embodiment.

In the following description, the head leading end pointer will be simply referred to as a leading end pointer, and the head trailing end pointer will be simply referred to as a trailing end pointer.

If band mapping in question is the first one, the leading end pointer 12 and trailing end pointer 13 are respectively set at the first and fourth columns in step S11 (the state shown in FIG. 4). The flow advances to step S12, and when band mapping in question is the second or subsequent one, and the leading end pointer falls outside that band in the previous band process, right-left end detection is done up to the leading end pointer. In step S13, the right and left end values for one column pointed by the leading end pointer 12 are detected, and are respectively stored in the registers 7 and 6. Such storage can be attained by abandoning the right and left end values of the oldest column stored in the registers 7 and 6, and storing those of the column pointed by the head leading end pointer.

Note that in the process in step S13 executed immediately after the trailing end pointer 13 has been updated, the right and left end values of the column pointed by the leading end pointer 12 are respectively stored in the registers 5 and 4 as the rightmost and leftmost end values.

In step S14, the latest right and left end values stored in the registers 7 and 6 are compared with the rightmost and leftmost end values stored in the registers 7 and 6. As a result, if at least one of the rightmost and leftmost end values must be changed, the rightmost end value and/or the leftmost end value in the registers 5 and/or 4 are/is updated in step S15. If it is determined in step S16 that the leading end pointer matches the trailing end pointer, since it means that detection for four columns has been finished, the rightmost and leftmost end values stored in the registers 5 and 4 are supplied to the printer together with print data for one printing scan in step S18. Note that, the print data is obtained from the intra-band data generated by the intra-band mapping process. In order to process the next head height region, the leading end pointer is shifted by the head height (four columns) in step S19.

If it is determined in step S14 that the rightmost and leftmost end values remain unchanged, the flow advances to step S17 to check if the leading end pointer matches the trailing end pointer. If it is determined in step S17 that the leading end pointer matches the trailing end pointer, since this means that detection for four columns has been finished, the flow advances to step S19 to process the next head height region. If it is determined in step S16 or S17 that the leading end pointer does not match the trailing end pointer, since more than one columns remain unprocessed in the head height region of interest, the flow advances to step S20.

In step S20, the leading end pointer 12 is incremented by one column to process the next column. It is then checked in step S21 if the leading end pointer falls within the band of interest. If the leading end pointer falls within the band of interest, since data for one column can be transferred, the flow returns to step S13 to execute right-left end detection.

Figure 6A:
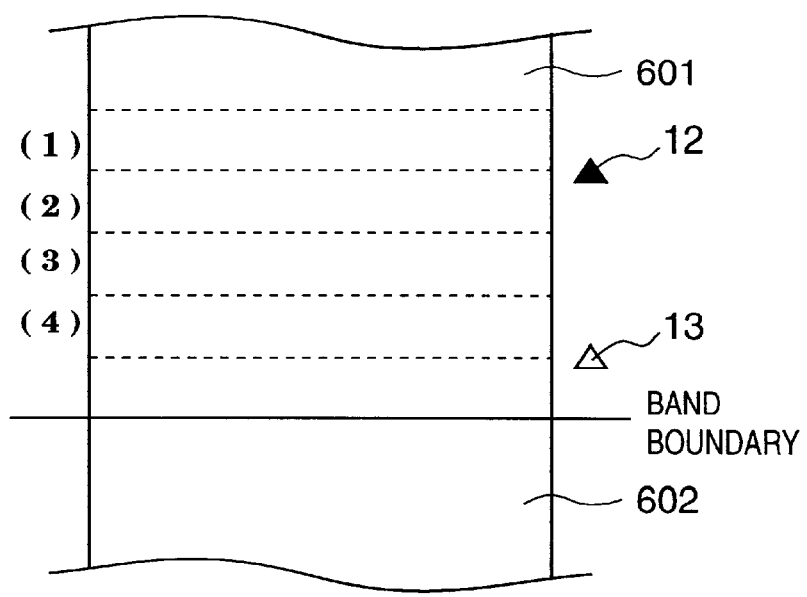
FIGS. 6A to 6C are views for explaining the position of a head start pointer and transfer data.

FIG. 6A shows that state. The leading end pointer 12 moves in turn from a position (illustrated position) where it points to column (1) to positions where it points to columns (2), (3), and (4) to detect the rightmost and leftmost end values. When the position of the leading end pointer 12 matches that of the trailing end pointer 13 (the lowermost end position of column (4)), it is determined that the process for the total head height space is complete. In case of FIG. 6A, since the position of the leading end pointer 12 falls within a band 601 to be processed, data that pertain to the corresponding four columns are transferred, the trailing end pointer 13 is shifted by four columns (S19), and the leading end pointer 12 is shifted by one column to point to the next column (S20). If the leading end pointer 12 still stays in the band to be processed (S21), the flow returns to step S13 to execute a process for the next column.

Since changes in rightmost and leftmost end values are checked in units of four columns, if at least one column that has undergone a change in rightmost or leftmost end value is found, the flow branches from step S14 to "YES" until the trailing end pointer is shifted. If the right and left end values of the column pointed by the leading end pointer 12 have respectively exceeded the rightmost and leftmost end values, the contents of the rightmost or leftmost end value register are updated.

As a result of pointer movement in step S20, if the leading end pointer falls outside the band to be processed, the flow advances to step S22 to detect the right and left ends of the remaining data in that band to be processed, thus starting the next band process (starting image mapping of the next band process).

Figure 6B:
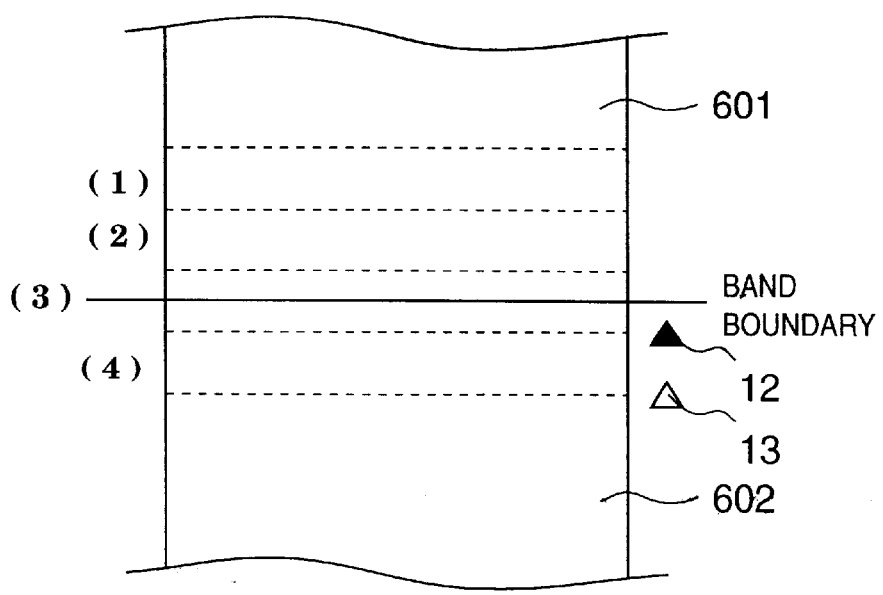

FIG. 6B shows that state. When the head leading end pointer 12 has reached a position where it points to column (3) (lowermost end of column (3)), it falls outside the band 601 to be processed. Hence, in step S22 remaining data (those belonging to the band 601 of column (3)) of the band 601 undergo rightmost-leftmost end value detection. That is, the rightmost and leftmost end values stored in the registers 5 and 4 are updated as needed on the basis of the right and left end values of the print widths of a portion of column (3) that belongs to the band 601. After that, data from the first to end lines of the column of interest are transferred.

Upon completion of image mapping of a new band to be processed (band 602), the process restarts from step S12. Since the head leading end pointer 12 is present within the band of interest, right-left end detection is done up to the line pointed by the head leading end pointer (the lowermost end position of column (3) in FIG. 6B). More specifically, the rightmost and leftmost end values stored in the registers 5 and 4 are updated as needed on the basis of the right and left end values of the print width of a portion of the column (3) that belongs to the band 602. The flow then advances to step S13 to repeat the aforementioned process. Immediately after the right-left end detection in step S12, the control skips step S14.

Figure 6C:
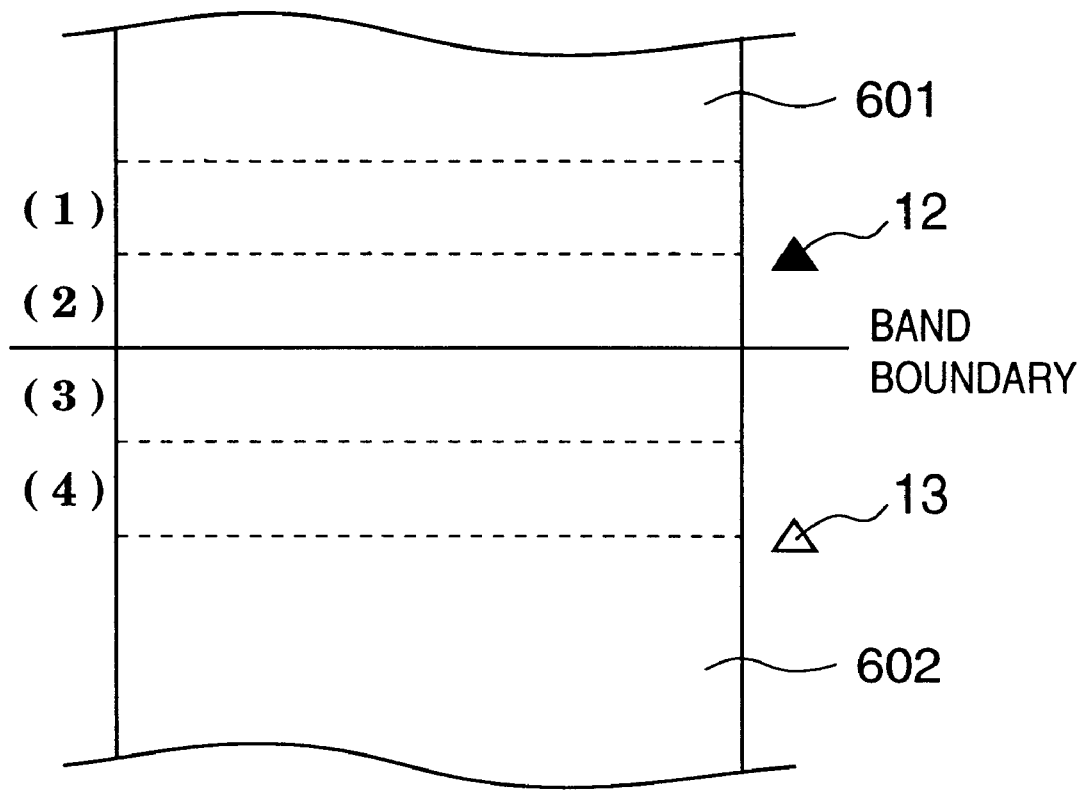

On the other hand, when a band boundary matches a column boundary, as shown in FIG. 6C, the process in step S22 is executed when the leading end pointer has moved to a position where it indicates column (3). However, in this case, since there is no data of column (3) that belongs to the band 601, the process in step S22 is skipped in practice.

With the aforementioned processes, since the rightmost and leftmost end values within the 4-column range are always supplied to the printer, printing for the total head height is assured as long as data are printed within this range. As a consequence, since the scan width of the heads has a range corresponding to the contents to be printed, high-speed printing can be achieved. Also, since the printer need not determine the right and left end values in units of columns, the processing speed can be improved.

Second Embodiment

In the first embodiment, the printer receives the rightmost and leftmost end values from the host computer to control the scan range of the print heads. However, in the second embodiment, the printer itself determines the rightmost and leftmost end values.

Figure 7:
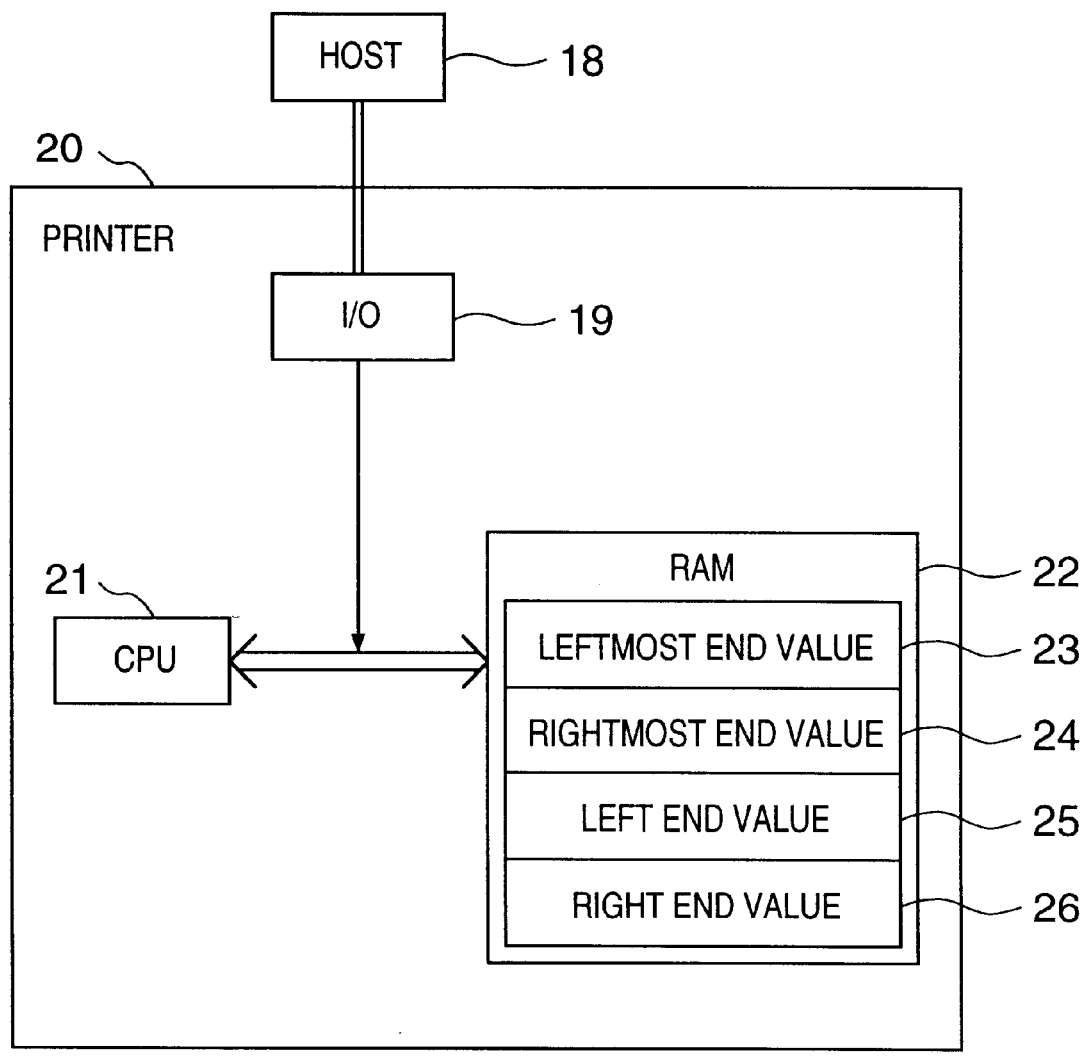
FIG. 7 is a block diagram showing the arrangement of a printer when the printer acquires the rightmost and leftmost end values.

FIG. 7 is a block diagram showing the arrangement of the printer when the printer itself acquires the rightmost and leftmost end values. A host 18 informs a printer 20 of the scan range (right and left end values) of print heads in units of head heights (columns). The printer 20 stores previous right and left end values for the total head height space (four columns) of print data transferred from the host 18 in buffers 26 and 25. Buffers 24 and 23 respectively store rightmost and leftmost end values that determine the head scan range. Note that the rightmost and leftmost end values are determined from the right and left end values for four columns stored in the registers 26 and 25.

Figure 8:
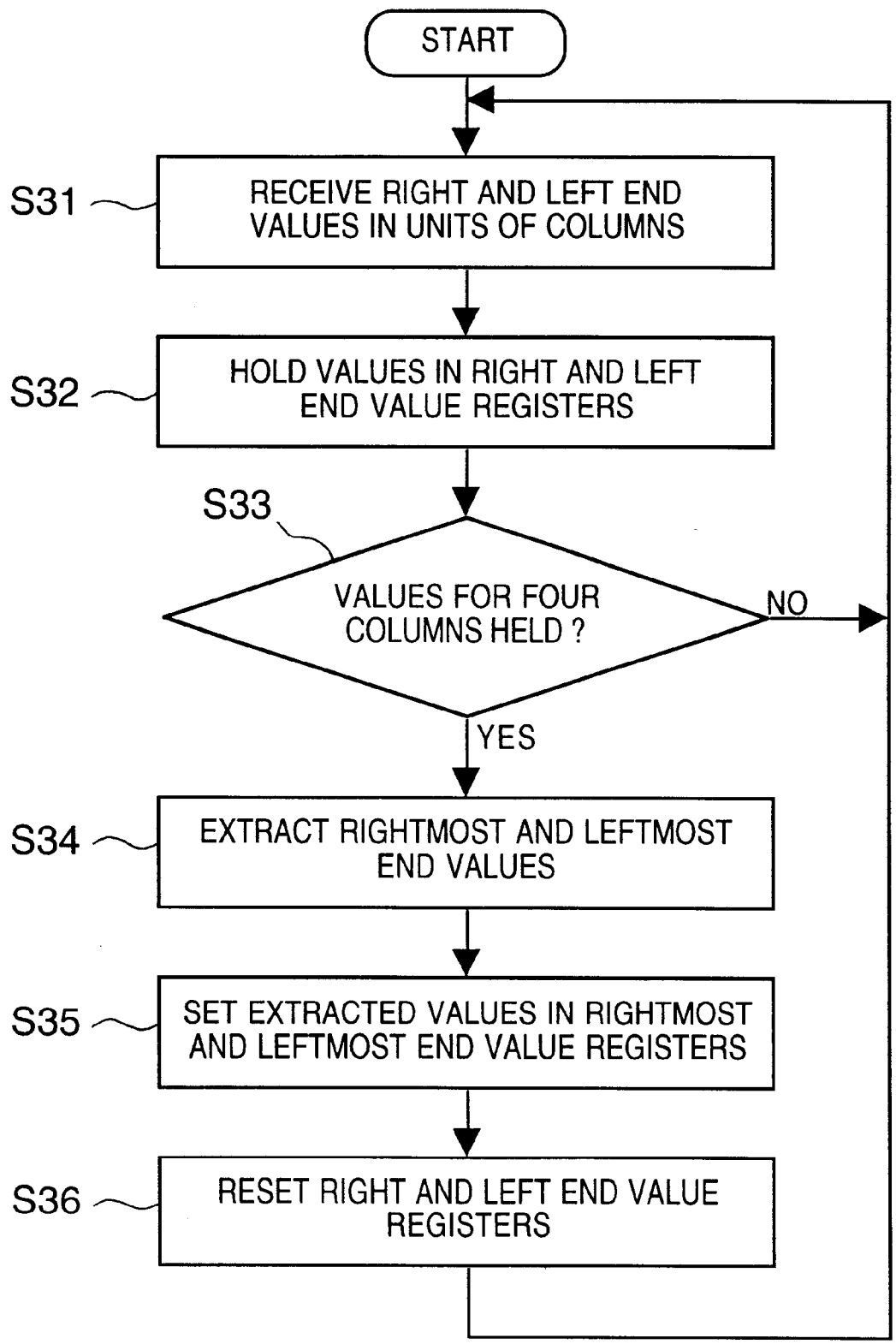
FIG. 8 is a flow chart showing the processing of the printer when the printer acquires the rightmost and leftmost end values.

FIG. 8 is a flow chart for explaining the process for determining the print scan width in the printer according to the second embodiment. Referring to FIG. 8, the right and left end values are received in units of columns in step S31. The right and left end values received in step S31 are held in the registers 26 and 25 in step S32. It is checked in step S33 if the right and left end values for four columns are held in the registers 26 and 25. If the right and left end values for four columns are held in the registers 26 and 25, the flow advances to step S34 to extract the rightmost and leftmost end values from the stored right and left end values for four columns. The rightmost and leftmost end values extracted in step S34 are set in the registers 24 and 23 in step S35. In step S36, the contents of the registers 25 and 26 are reset to prepare for the determination process of the print scan width for the next print data.

In this way, the previous right and left end values for the total head height space are held in the registers 26 and 25, and the rightmost and leftmost end values held in the buffers 24 and 23 are updated by those determined by these right and left end values.

When the printer 20 prints by scanning the print heads within the scan range determined by the rightmost and leftmost end values indicated by the registers 24 and 23, printing for the total head height is guaranteed.

Figure 9:
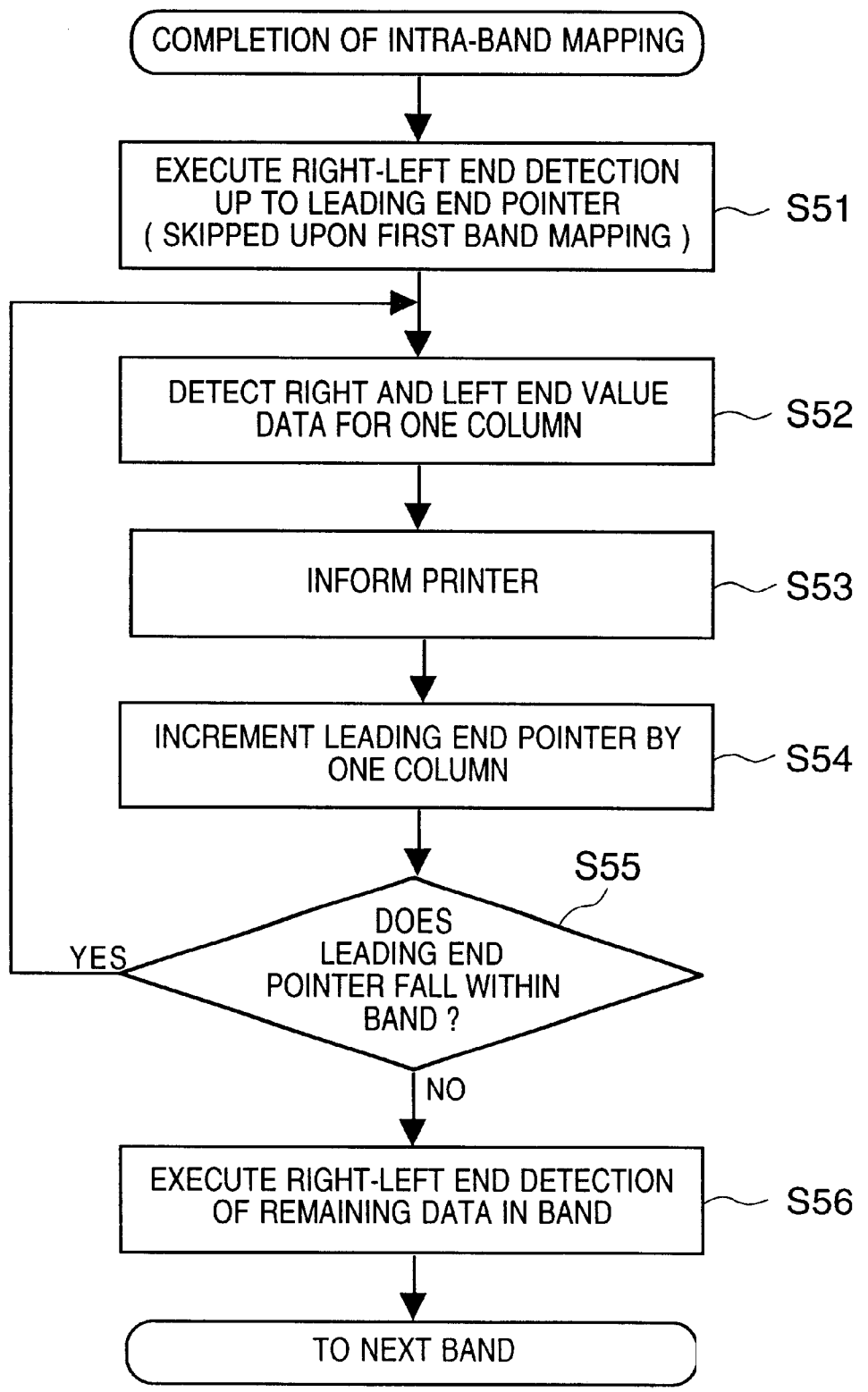
FIG. 9 is a flow chart showing the processing of a host when the printer acquires the rightmost and leftmost end values.

Note that the processing sequence of the host in this case is as shown in FIG. 9.

When the first band is mapped, the control skips step S51, and the right and left end values of a column pointed by the leading end pointer are acquired in step S52. These values are supplied to the printer in step S53. The leading end pointer is shifted by one column in step S54. As a result, if the leading end pointer falls within the band of interest, the flow returns from step S55 to step S52 to supply the right and left end values of the next column. On the other hand, if the leading end pointer falls outside the band of interest, the right and left end values of a portion that belongs to the band of interest are detected in step S56.

Upon completion of the next band mapping, in step S51 the right and left end values are detected up to the leading end pointer that has been moved in step S54. Immediately after the right-left end detection in step S51, in step S52 the right and left values of the column of interest are acquired based on the detection results in steps S56 and S51.

In this fashion, the host apparatus can supply the right and left end values in units of columns to the printer.

Third Embodiment

In the third embodiment, the rightmost and leftmost end values are determined by the method of the first embodiment, and these values are converted into operation control values for the carriage (print heads) by a printer engine before they are supplied to the printer. For this reason, the printer engine need not calculate any data upon controlling the print head scan range, thus achieving high-speed printing.

Figure 11:
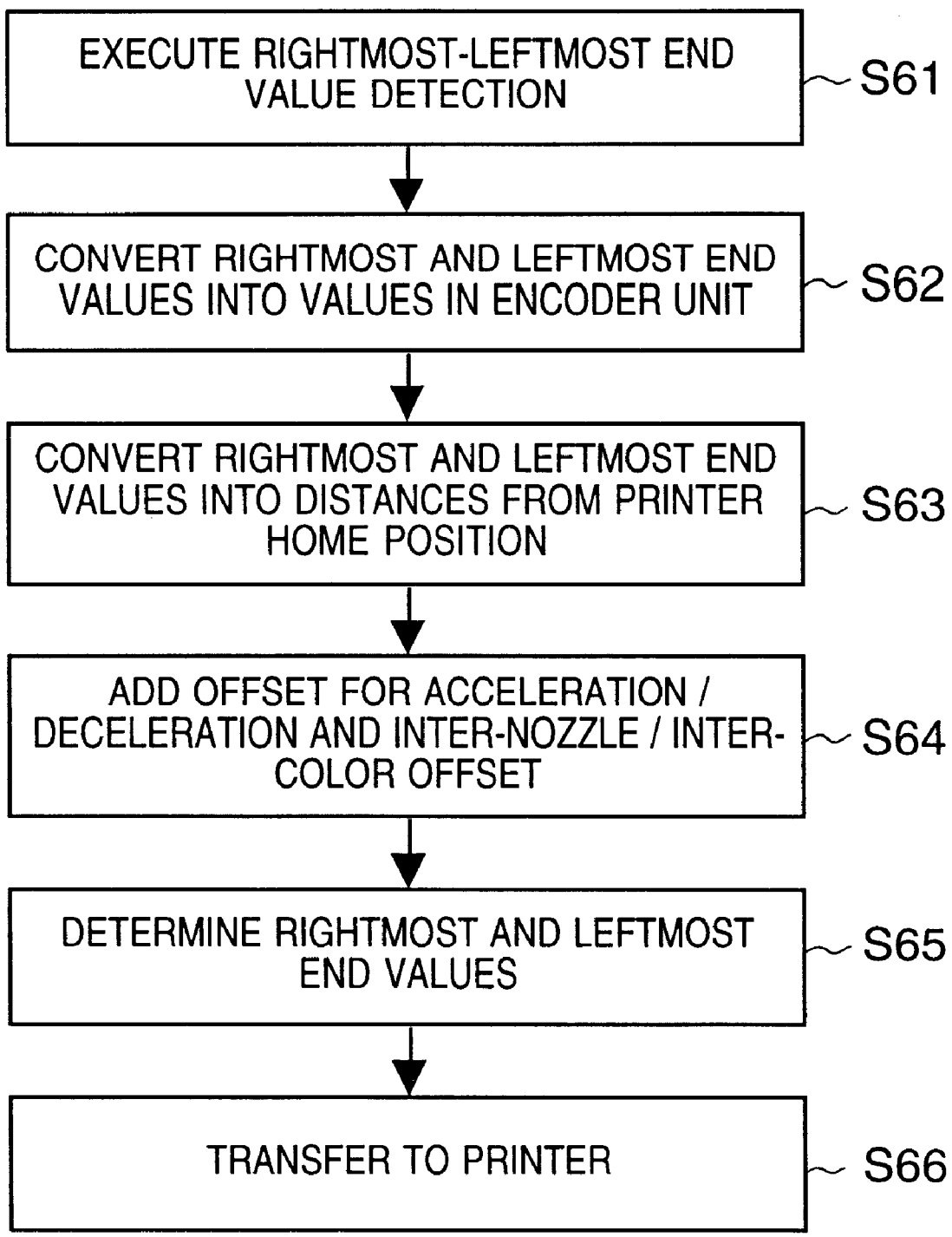
FIG. 11 is a flow chart for explaining a carriage operation range determination process according to the third embodiment.

FIG. 10 is a diagram for explaining the program arrangement of a printer driver according to the third embodiment. As shown in FIG. 10, a CPU 2 loads a printer driver 13 installed in an external storage device 12 onto a RAM (main memory; not shown) as needed and executes it. A right-left end detection module 13a is like one described earlier in the first embodiment, and a detailed description thereof will be omitted. A carriage operation range determination module 13b generates data (control values) appropriate to carriage control in an ink-jet printer 11 based on the rightmost and leftmost end values detected by the right-left end detection module 13a, and outputs them to the ink-jet printer 11 via the I/O interface 10. Note that, the data (control values) appropriate for carriage control can be obtained by process where information indicating leftmost end position and rightmost end position in main scanning directions are changed into values for printer control. The operation of the carriage operation range determination module 13b will be explained below. FIG. 11 is a flow chart for explaining the carriage operation range determination process according to the third embodiment. A case will be exemplified below wherein the carriage control of the printer is controlled using an encoder sensor.

In step S61, the right-left end detection module 13a detects the rightmost and leftmost end values by the process that has been explained in the first embodiment. The rightmost and leftmost end values obtained in step S61 are defined by resolution obtained when the driver maps data. Hence, these rightmost and leftmost end values are converted into values in units for an encoder in the printer. For example, if the resolution of an image obtained when the driver maps data is 600 dpi, and the encoder sensor of the printer has a resolution of 300 dpi, the right and left end values obtained in steps S61 are divided by 2 to be converted into values in units of 300 dpi. Computations in the subsequent processes are done in units of 300 dpi.

In step S63, the rightmost and leftmost end values are converted into distances from the home position of the carriage in the printer engine. In step S64, offsets that assure acceleration/deceleration regions of the carriage, and inter-nozzle/inter-color offsets are added to the rightmost and leftmost end values. For example, in the actual carriage operation range, the printing range must be a constant-speed range of the carriage. Hence, upon printing in the forward direction (from the left to right), an acceleration distance is subtracted from the leftmost end value, and a deceleration distance is added to the rightmost end value. In case of heads each having horizontal arrays of nozzles (for example, nozzle arrays for each colors are located along main scanning direction), inter-nozzle arrays (inter-color) offsets must be added to the rightmost and leftmost end values as other offsets.

The rightmost and leftmost end values obtained in this way are determined as data to be actually transferred to the printer engine in step S65, and are transferred to the printer in step S66.

With the above-mentioned processes, the carriage operation range can be determined and printing can be done without any computations for determining the carriage operation range in the printer.

In the above embodiments, the present invention is applied to an ink-jet recording apparatus which comprises a plurality of recording heads having an identical recording width. However, the present invention may be applied to an ink-jet recording apparatus which comprises a plurality of recording heads having different recording widths respectively. For example, the present invention can be applied to an ink-jet recording apparatus in which the number of nozzles on a recording heads for black ink are increased so as to quickly record monochrome document and the like. Also in this case, as described in the above embodiments, leftmost and rightmost end values can be determined by detecting left and right end values of images corresponding to each of the plurality of recording heads.

Also, the present invention can be applied to an arrangement where a plurality of recording heads are located along the main scanning direction, and an arrangement where a plurality of recording heads are located along the sub scanning direction (vertical to the main scanning direction). Further, the arrangement having the plurality of recording heads located along the sub scanning direction includes an arrangement where a plurality of nozzles consisting a nozzle line are divided into a plurality of groups for controlling nozzle drive.

Furthermore, although the above embodiments describes an example where the present invention is applied to an ink-jet recording manner in which recording is made by emitting ink, the present invention is not limited to this example and can be applied to the other recording manner.

The present invention achieves particular advantages when it is applied to having an ink-jet recording head of the type in which printing is performed by forming flying droplets utilizing thermal energy is described.

With regard to a typical configuration and operating principle, it is preferred that the foregoing be achieved using the basic techniques disclosed in the specification s of U.S. Pat. Nos. 4,732,129 and 4,740,796. This scheme is applicable to both so-called on-demand-type and continuous-type apparatus. In particular, in the case of the on-demand type, at least one drive signal, which provides a sudden temperature rise that exceeds that for film boiling, is applied, in accordance with print information, to an electrothermal transducer arranged to correspond to a sheet or fluid passageway holding a fluid (ink). As a result, thermal energy is produced in the electrothermal transducer to bring about film boiling on the thermal working surface of the recording head. Accordingly, air bubbles can be formed in the fluid (ink) in one-to-one correspondence with the drive signals.

As described above, according to the above embodiments, the previous rightmost and leftmost end values of the scan range in the main scanning direction for the total head height space are stored and held in the rightmost and leftmost end value registers. For this reason, the range in the main scanning direction can be determined within a short period of time, and the print heads can be controlled to move within that scan range. In this way, when printing is done by controlling the print heads to move within the print range, any idle operation time of the print heads upon printing can be reduced, and the print time can be shortened.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, the print scan range of the print heads in the main scan direction can be efficiently controlled, and the print time can be shortened.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus connected to a printer through a signal line, which has a plurality of recording heads each capable of recording with a recording width, and performs printing by scanning the plurality of recording heads in a main scanning direction, comprising:

generation means for generating print data to be provided to said printer;

obtaining means for determining a print range in the main scanning direction, which is required by the print data, and obtaining range information indicating the print range, the range information indicating a scanning end position of the plurality of recording heads and being available for said printer to control the main scanning of the plurality of recording heads;

informing means for informing said printer of the range information obtained by said obtaining means, through said signal line; and transmission means for transmitting the print data to said printer, through said signal line.

2. An information processing apparatus connected to a printer through a signal line, which has a plurality of recording heads each capable of recording with a recording width, and performs printing by scanning the plurality of recording heads in a main scanning direction, comprising:

generation means for generating print data to be provided to said printer;

obtaining means for determining a print range in the main scanning direction, which is required by the print data, and obtaining rightmost and leftmost end print positions in units of a recording width on the basis of the print range, the rightmost and leftmost end print positions being available for said printer to control the main scanning of the plurality of recording heads;

informing means for informing said printer of the rightmost and leftmost end print positions obtained by said obtaining means, through said signal line; and transmission means for transmitting the print data to said printer, through said signal line.

3. The apparatus according to claim 2, wherein said obtaining means detects a print region of each recording heads on the basis of recording data corresponding to each recording head and obtains the rightmost and leftmost end print positions in units of recording heads on the basis of the detected print region.

4. The apparatus according to claim 3, wherein the print region represents right and left end print positions of each of the plurality of recording heads.

5. The apparatus according to claim 2, wherein said obtaining means comprises:

detection means for detecting right and left end print positions of a print region in units of recording heads;

holding means for holding the right and left end print positions detected by said detection means in correspondence with at least the print height; and obtaining means for obtaining the rightmost and leftmost end print positions in units of print heights from the right and left end print positions held in said holding means.

6. The apparatus according to claim 2, wherein said obtaining means obtains the rightmost and leftmost end print positions of a print region on the basis of next print data to be output to said printer.

7. An image forming apparatus for recording an image based on print data supplied by an external apparatus, said image forming apparatus having a plurality of recording heads each capable of recording with a recording width, and performing printing by scanning the plurality of recording heads in a main scanning direction, comprising:

reception means for receiving print data corresponding to the plurality of recording heads and range information indicating a print region in the main scanning direction when performing printing based on the print data;

holding means for holding the range information received by said reception means in correspondence with an area to be recorded by one scanning operation of the plurality of recording heads;

determination means for determining rightmost and leftmost end print positions in the main scanning direction for the print data based on the range information held in said holding means; and image forming means for printing an image by scanning said plurality of recording heads in the main scanning direction within a range defined by the rightmost and leftmost end print positions determined by said determination means.

8. The apparatus according to claim 7, wherein said recording heads are ink-jet recording heads.

9. The apparatus according to claim 7, wherein the range information represents right and left end print positions of print data in units of one column heights.

10. An image forming system which comprises a printer which has a plurality of recording heads each capable of recording with a recording width, and performs printing by scanning the plurality of recording heads in a main scanning direction, and a host apparatus for transmitting print data to said printer, said printer and said host apparatus being connected through a signal line, comprising:

generation means, provided in said host apparatus, for generating print data to be provided to said printer;

obtaining means, provided in said host apparatus, for obtaining rightmost and leftmost end print positions in units of recording heads on the basis of the print data corresponding to the plurality of recording heads;

determination means, provided in said printer, for determining a scan range of said plurality of recording heads on the basis of the rightmost and leftmost end print positions obtained by said obtaining means; and image forming means, provided in said printer, for forming an image on the basis of the print data by moving said plurality of recording heads within the scan range determined by said determination means.

11. The system according to claim 10, wherein said obtaining means detects a print region in units of recording heads, and obtains the rightmost and leftmost end print positions in units of recording heads on the basis of the detected print region.

12. The system according to claim 11, wherein the print region represents right and left end print positions in the main scanning direction.

13. The system according to claim 10, wherein said obtaining means is provided to said host apparatus, and comprises:

detection means for detecting a print scan range for each recording width of the plurality of recording heads on the basis of the print data;

holding means for holding range information which represents the print scan range detected by said detection means in correspondence with at least the recording width;

obtaining means for obtaining the rightmost and leftmost end print positions in units of recording heads from the range information held in said holding means; and informing means for informing the printer of the rightmost and leftmost end print positions calculated by said obtaining means.

14. The system according to claim 10, wherein said obtaining means comprises:

detection means for detecting the scan range in units of recording heads on the basis of the print data in said host apparatus;

informing means for informing the printer, from said host apparatus, of range information that represents the scan range detected by said detection means;

holding means for holding the range information informed by said informing means in correspondence with at least an area to be recorded by one scanning operation of the plurality of recording heads in said printer; and obtaining means for obtaining the rightmost and leftmost end print positions on the basis of the range information held in said holding means.

15. The apparatus according to claim 1, further comprising:

conversion means for converting the range information obtained by said obtaining means into control values corresponding to a driving system of said printer, wherein said informing means informs said printer of the control values obtained by said conversion means.

16. The apparatus according to claim 2, further comprising:

conversion means for converting an operation range of said recording heads obtained on the basis of the rightmost and leftmost end print positions obtained by said obtaining means into control values corresponding to a driving system of said printer, wherein said informing means informs said printer of the control values obtained by said conversion means.

17. The apparatus according to claim 16, wherein said conversion means determines the operation range of said recording heads by combining the rightmost and leftmost end print positions, and an offset based on an acceleration/deceleration region of said recording heads and an offset based on a nozzle layout.

18. The system according to claim 13, wherein said informing means has conversion means for converting an operation range of said recording heads obtained on the basis of the rightmost and leftmost end print positions obtained by said obtaining means into control values corresponding to a driving system of said printer, and informs said printer of the control values obtained by said conversion means.

19. The apparatus according to claim 8, wherein said recording head is an ink-jet head which has an electrothermal transducer applying thermal energy to ink and discharges the ink thereby.

* * * * *